United States Patent
Amitai et al.

(10) Patent No.: US 10,782,532 B2
(45) Date of Patent: Sep. 22, 2020

(54) COMPACT HEAD-MOUNTED DISPLAY SYSTEM PROTECTED BY A HYPERFINE STRUCTURE

(71) Applicant: LUMUS LTD., Ness Ziona (IL)

(72) Inventors: Yaakov Amitai, Rehovot (IL); Yuval Ofir, Kfar HaOranim (IL); Elad Mor, Mazkeret Batya (IL)

(73) Assignee: Lumus Ltd., Ness Ziona (IL)

( * ) Notice: Subject to any disclaimer, the term of this patent is extended or adjusted under 35 U.S.C. 154(b) by 0 days.

(21) Appl. No.: 16/583,274

(22) Filed: Sep. 26, 2019

(65) Prior Publication Data

US 2020/0089001 A1 Mar. 19, 2020

Related U.S. Application Data

(63) Continuation of application No. 15/525,366, filed as application No. PCT/IL2015/051087 on Nov. 10, 2015, now Pat. No. 10,520,731.

(30) Foreign Application Priority Data

Nov. 11, 2014 (IL) .......................................... 235642

(51) Int. Cl.
  *G02B 27/14* (2006.01)
  *G02B 27/01* (2006.01)
  *G02B 6/34* (2006.01)

(52) U.S. Cl.
  CPC ........... *G02B 27/0172* (2013.01); *G02B 6/34* (2013.01); *G02B 2027/0178* (2013.01)

(58) Field of Classification Search
  CPC .................. G02B 27/0172; G02B 6/34; G02B 2027/0178
  See application file for complete search history.

(56) References Cited

U.S. PATENT DOCUMENTS 2,748,859 A 6/1956 Geffcken et al.
2,795,069 A 6/1957 Hardesty
(Continued)

FOREIGN PATENT DOCUMENTS

CN 101542346 9/2009
CN 107238928 10/2017
(Continued)

OTHER PUBLICATIONS

Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.
S. Chattopadhyay et al: "Anti-reflecting and photonic nanostructures", Materials Science and Engineering: R: Repots, vol. 69, No. 1-3, Jun. 20, 2010, pp. 1-35.
(Continued)

*Primary Examiner* — Joseph P Martinez
(74) *Attorney, Agent, or Firm* — Mark M. Friedman

(57) ABSTRACT

There is provided an optical system, including a light-transmitting substrate (20) having at least two external major surfaces and edges, an optical element for coupling light waves into the substrate (20) by internal reflection, at least one partially reflecting surface located in the substrate (20), for coupling light waves out of the substrate (20), at least one transparent air gap film (110) including a base (112) and a hyperfine structure (111) defining a relief formation, constructed on the base, wherein the air gap film is attached to one of the major surfaces of the substrate (20), with the relief formation facing the substrate (20) defining an interface plane (58), so that the light waves coupled inside the substrate (20) are substantially totally reflected from the interface plane (58).

28 Claims, 19 Drawing Sheets

(56) References Cited

U.S. PATENT DOCUMENTS

| | | |
|---|---|---|
| 2,886,911 A | 5/1959 | Hardesty |
| 3,491,245 A | 1/1970 | Hardesty |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,857,109 A | 12/1974 | Pilloff |
| 3,873,209 A | 3/1975 | Schinke et al. |
| 3,940,204 A | 2/1976 | Withrington |
| 3,969,023 A | 7/1976 | Brandt |
| 4,084,883 A | 4/1978 | Eastman et al. |
| 4,191,446 A | 3/1980 | Arditty et al. |
| 4,309,070 A | 1/1982 | St Leger Searle |
| 4,331,387 A | 5/1982 | Wentz |
| 4,355,864 A | 10/1982 | Soref |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,231,642 A | 7/1993 | Scifres et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Machler |
| 5,712,694 A | 1/1998 | Taira et al. |
| 5,724,163 A | 3/1998 | David |
| 5,751,480 A | 5/1998 | Kitagishi |
| 5,764,412 A | 6/1998 | Suzuki et al. |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Amitai et al. |
| 5,982,536 A | 11/1999 | Swan |
| 6,021,239 A | 2/2000 | Minami et al. |
| 6,052,500 A | 4/2000 | Takano et al. |
| 6,091,548 A | 7/2000 | Chen |
| 6,144,347 A | 11/2000 | Mizoguchi et al. |
| 6,222,676 B1 | 4/2001 | Togino et al. |
| 6,231,992 B1 | 5/2001 | Niebauer et al. |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,490,104 B1 | 12/2002 | Gleckman et al. |
| 6,509,982 B2 | 1/2003 | Steiner |
| 6,542,307 B2 | 4/2003 | Gleckman |
| 6,556,282 B2 | 4/2003 | Jamieson et al. |
| 6,577,411 B1 | 6/2003 | David |
| 6,580,529 B1 | 6/2003 | Amitai et al. |
| 6,671,100 B1 | 12/2003 | McRuer |
| 6,690,513 B2 | 2/2004 | Hulse et al. |
| 6,710,902 B2 | 3/2004 | Takeyama |
| 6,775,432 B2 | 8/2004 | Basu |
| 6,791,760 B2 | 9/2004 | Janeczko et al. |
| 6,798,579 B2 | 9/2004 | Robinson et al. |
| 6,799,859 B1 * | 10/2004 | Ida ................... G02B 6/0036 362/335 |
| 6,829,095 B2 | 12/2004 | Amitai |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,339,742 B2 | 3/2008 | Amitai et al. |
| 7,355,795 B1 | 4/2008 | Yamazaki et al. |
| 7,391,573 B2 | 6/2008 | Amitai |
| 7,418,170 B2 | 8/2008 | Mukawa et al. |
| 7,430,355 B2 | 9/2008 | Heikenfeld et al. |
| 7,448,170 B2 | 11/2008 | Skendzic et al. |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,751,122 B2 | 7/2010 | Amitai |
| 7,778,508 B2 | 8/2010 | Hirayama |
| 7,884,985 B2 | 2/2011 | Amitai et al. |
| 7,949,214 B2 | 5/2011 | Dejong |
| 7,995,275 B2 | 8/2011 | Maeda et al. |
| 8,000,020 B2 | 8/2011 | Amitai |
| 8,004,765 B2 | 8/2011 | Amitai |
| 8,035,872 B2 | 10/2011 | Ouchi |
| 8,098,439 B2 | 1/2012 | Amitai et al. |
| 8,187,481 B1 | 5/2012 | Hobbs |
| 8,369,019 B2 | 2/2013 | Baker |
| 8,405,573 B2 | 3/2013 | Lapidot et al. |
| 8,432,614 B2 | 4/2013 | Amitai |
| 8,643,948 B2 | 2/2014 | Amitai et al. |
| 8,655,178 B2 | 2/2014 | Capron et al. |
| 8,665,178 B1 | 3/2014 | Wang |
| 8,666,208 B1 | 3/2014 | Amirparviz et al. |
| 8,736,963 B2 | 5/2014 | Robbins et al. |
| 8,743,464 B1 | 6/2014 | Amirparviz |
| 8,810,914 B2 | 8/2014 | Amitai et al. |
| 8,861,081 B2 | 10/2014 | Amitai et al. |
| 8,873,148 B1 | 10/2014 | Gupta et al. |
| 8,902,503 B2 | 12/2014 | Amitai et al. |
| 8,913,865 B1 | 12/2014 | Bennett |
| 8,965,152 B2 | 2/2015 | Simmonds |
| 9,025,253 B2 | 5/2015 | Hadad et al. |
| 9,069,180 B2 | 6/2015 | Amitai et al. |
| 9,104,036 B2 | 8/2015 | Amitai et al. |
| 9,207,457 B2 | 12/2015 | Amitai |
| 9,248,616 B2 | 2/2016 | Amitai |
| 9,279,986 B2 | 3/2016 | Amitai |
| 9,316,832 B2 | 4/2016 | Amitai et al. |
| 9,417,453 B2 | 8/2016 | Amitai et al. |
| 9,448,408 B2 | 9/2016 | Amitai et al. |
| 9,500,869 B2 | 11/2016 | Amitai |
| 9,551,880 B2 | 1/2017 | Amitai |
| 9,568,738 B2 | 2/2017 | Mansharof et al. |
| 9,740,013 B2 | 8/2017 | Amitai et al. |
| 9,804,396 B2 | 10/2017 | Amitai |
| 9,805,633 B2 | 10/2017 | Zheng |
| 9,910,283 B2 | 3/2018 | Amitai |
| 9,933,684 B2 | 4/2018 | Brown et al. |
| 10,048,499 B2 | 8/2018 | Amitai |
| 10,261,321 B2 | 4/2019 | Amitai |
| 10,302,835 B2 | 5/2019 | Danziger |
| 2001/0030860 A1 | 10/2001 | Kimura et al. |
| 2002/0015233 A1 | 2/2002 | Park |
| 2002/0176173 A1 | 11/2002 | Song |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0072160 A1 | 4/2003 | Kuepper et al. |
| 2003/0090439 A1 | 5/2003 | Spitzer et al. |
| 2003/0165017 A1 | 9/2003 | Amitai et al. |

(56) References Cited

U.S. PATENT DOCUMENTS

| | | |
|---|---|---|
| 2003/0197938 A1 | 10/2003 | Schmidt et al. |
| 2003/0218718 A1 | 11/2003 | Moliton et al. |
| 2004/0085649 A1 | 5/2004 | Repetto et al. |
| 2004/0137189 A1 | 7/2004 | Tellini et al. |
| 2004/0233534 A1 | 11/2004 | Nakanishi et al. |
| 2005/0018308 A1 | 1/2005 | Cassarly et al. |
| 2005/0024849 A1 | 2/2005 | Parker et al. |
| 2005/0084210 A1 | 4/2005 | Cha |
| 2005/0174641 A1 | 8/2005 | Greenberg |
| 2005/0174658 A1 | 8/2005 | Long et al. |
| 2005/0180687 A1 | 8/2005 | Amitai et al. |
| 2005/0265044 A1 | 12/2005 | Chen et al. |
| 2006/0126182 A1 | 6/2006 | Levola |
| 2006/0268421 A1 | 11/2006 | Shimizu et al. |
| 2007/0070859 A1 | 3/2007 | Hirayama |
| 2007/0188837 A1 | 8/2007 | Shimizu et al. |
| 2008/0025667 A1 | 1/2008 | Amitai |
| 2008/0094586 A1 | 4/2008 | Hirayama |
| 2008/0151375 A1 | 6/2008 | Lin |
| 2008/0151379 A1 | 6/2008 | Amitai |
| 2008/0192239 A1 | 8/2008 | Otosaka |
| 2008/0198471 A1 | 8/2008 | Amitai |
| 2008/0247150 A1 | 10/2008 | itoh et al. |
| 2008/0278812 A1 | 11/2008 | Amitai |
| 2009/0010023 A1 | 1/2009 | Kanada et al. |
| 2009/0052046 A1 | 2/2009 | Amitai |
| 2009/0122414 A1 | 5/2009 | Amitai |
| 2009/0190222 A1 | 7/2009 | Simmonds et al. |
| 2010/0067110 A1 | 3/2010 | Amitai et al. |
| 2010/0111472 A1 | 5/2010 | DeJong |
| 2010/0202128 A1 | 8/2010 | Saccomanno |
| 2010/0278480 A1 | 11/2010 | Vasylyev et al. |
| 2010/0291489 A1 | 11/2010 | Moskovits et al. |
| 2011/0096566 A1 | 4/2011 | Tsai et al. |
| 2011/0227661 A1 | 9/2011 | Numata et al. |
| 2011/0242661 A1 | 10/2011 | Simmonds |
| 2012/0039576 A1 | 2/2012 | Dangel et al. |
| 2012/0062998 A1 | 3/2012 | Schultz et al. |
| 2012/0147361 A1 | 6/2012 | Mochizuki et al. |
| 2012/0194781 A1 | 8/2012 | Agurok |
| 2012/0306940 A1 | 12/2012 | Machida |
| 2013/0022316 A1 | 1/2013 | Pelletier et al. |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0185142 A1 | 7/2014 | Gupta et al. |
| 2014/0226215 A1 | 8/2014 | Komatsu et al. |
| 2014/0226361 A1 | 8/2014 | Vasylyev |
| 2015/0016777 A1 | 1/2015 | Abovitz et al. |
| 2015/0081313 A1 | 3/2015 | Boross et al. |
| 2015/0138646 A1 | 5/2015 | Tatsugi |
| 2015/0153569 A1 | 6/2015 | Yonekubo |
| 2015/0160529 A1 | 6/2015 | Popovich et al. |
| 2015/0182748 A1 | 7/2015 | Gefen et al. |
| 2015/0219834 A1 | 8/2015 | Nichol et al. |
| 2015/0241619 A1 | 8/2015 | Richards et al. |
| 2016/0116743 A1 | 4/2016 | Amitai |
| 2016/0170214 A1 | 6/2016 | Amitai |
| 2016/0234485 A1 | 8/2016 | Robbins et al. |
| 2016/0238844 A1 | 8/2016 | Dobschal |
| 2016/0341964 A1 | 11/2016 | Amitai |
| 2016/0370693 A1 | 12/2016 | Watanabe |
| 2017/0045743 A1 | 2/2017 | Dobschal et al. |
| 2017/0045744 A1 | 2/2017 | Amitai |
| 2017/0075119 A1 | 3/2017 | Schultz et al. |
| 2017/0097506 A1 | 4/2017 | Schowengerdt et al. |
| 2017/0242249 A1 | 8/2017 | Wall |
| 2017/0336636 A1 | 11/2017 | Amitai et al. |
| 2017/0343822 A1 | 11/2017 | Border et al. |
| 2017/0357095 A1 | 12/2017 | Amitai |
| 2017/0363799 A1 | 12/2017 | Ofir |
| 2018/0039082 A1 | 2/2018 | Amitai |
| 2018/0157057 A1 | 6/2018 | Gelberg et al. |
| 2018/0292599 A1 | 10/2018 | Ofir et al. |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0293856 A1 | 9/2019 | Danziger |

FOREIGN PATENT DOCUMENTS

| | | | |
|---|---|---|---|
| DE | 1422172 | 11/1970 | |
| DE | 19725262 | 12/1998 | |
| DE | 102013106392 | 12/2014 | |
| EP | 0365406 | 4/1990 | |
| EP | 0380035 | 8/1990 | |
| EP | 0399865 | 11/1990 | |
| EP | 0543718 | 5/1993 | |
| EP | 0566004 | 10/1993 | |
| EP | 1158336 | 11/2001 | |
| EP | 1180711 | 2/2002 | |
| EP | 1326102 | 7/2003 | |
| EP | 1385023 | 1/2004 | |
| EP | 1485747 | 12/2004 | |
| EP | 1562066 | 8/2005 | |
| EP | 0770818 | 4/2007 | |
| EP | 1779159 | 5/2007 | |
| EP | 2530510 | 12/2012 | |
| FR | 2496905 | 6/1982 | |
| FR | 2638242 | 4/1990 | |
| FR | 2721872 | 1/1996 | |
| GB | 2220081 | 12/1989 | |
| GB | 2272980 | 6/1994 | |
| GB | 2278222 | 11/1994 | |
| GB | 2278888 | 12/1994 | |
| JP | 2001021448 | 1/2001 | |
| JP | 2002539498 | 11/2002 | |
| JP | 2003140081 | 5/2003 | |
| JP | 2003337298 A | 11/2003 | |
| JP | 2003536102 | 12/2003 | |
| JP | 2004527801 | 9/2004 | |
| JP | 2005084522 | 3/2005 | |
| JP | 2006003872 | 1/2006 | |
| JP | 2007505353 A | 3/2007 | |
| JP | 2010217906 A | 9/2010 | |
| JP | 2012123936 A | 6/2012 | |
| JP | WO2013065656 | * 5/2013 | ............... F21S 2/00 |
| JP | 2014506340 A | 3/2014 | |
| JP | 2016028275 A | 2/2016 | |
| TW | 201809798 | 3/2018 | |
| WO | 9510106 | 4/1995 | |
| WO | 9815868 | 4/1998 | |
| WO | 9952002 | 10/1999 | |
| WO | 0004407 | 1/2000 | |
| WO | 0063738 | 10/2000 | |
| WO | 0127685 | 4/2001 | |
| WO | 0195025 | 12/2001 | |
| WO | 0195027 | 12/2001 | |
| WO | 02082168 | 10/2002 | |
| WO | 03058320 | 7/2003 | |
| WO | 03081320 | 10/2003 | |
| WO | 2004109349 | 12/2004 | |
| WO | 2005024485 | 3/2005 | |
| WO | 2005024491 | 3/2005 | |
| WO | 2005024969 | 3/2005 | |
| WO | 2005093493 | 10/2005 | |
| WO | 2005124427 | 12/2005 | |
| WO | 2006013565 | 2/2006 | |
| WO | 2006085308 | 8/2006 | |
| WO | 2006085309 | 8/2006 | |
| WO | 2006085310 | 8/2006 | |
| WO | 2006087709 | 8/2006 | |
| WO | 2006098097 | 9/2006 | |
| WO | 2007054928 | 5/2007 | |
| WO | 2007093983 | 8/2007 | |
| WO | 2008023367 | 2/2008 | |
| WO | 2008129539 | 10/2008 | |
| WO | 2008149339 | 12/2008 | |

(56) References Cited

FOREIGN PATENT DOCUMENTS

| WO | 2009009268 | | 1/2009 |
|---|---|---|---|
| WO | 2009074638 | | 6/2009 |
| WO | 2011130720 | | 10/2011 |
| WO | 12088478 | A1 | 6/2012 |
| WO | 2013065656 | | 5/2013 |
| WO | 2013175465 | | 11/2013 |
| WO | 2013188464 | | 12/2013 |
| WO | 2015081313 | | 6/2015 |
| WO | 2015158828 | | 10/2015 |
| WO | 2016103251 | | 6/2016 |
| WO | 2016132347 | | 8/2016 |
| WO | 2017106873 | | 6/2017 |
| WO | 2017199232 | | 11/2017 |

OTHER PUBLICATIONS

Petros I Stavroulakis et al: "Suppression of backscattered diffraction from sub-wavelenght "moth-eye" arrays References and Links / Optics Express 1", Endeavour Nanotechnology Zoolog. Sci. Philos. Trans. J. Mod. Opt. Appl. Opt. Opt. Acta (Lond.) Appl. Opt. Appl. Opt. Opt. Lett. Jpn. J. Appl. Pjys. J. Ceram. Soc. Jpn. Opt. Commun. App;. Opt. Opt. Lett. Nanotechno, Jan. 1, 1967, pp. 79-84.

Chin-Hao Chang et al: "Nanostrutured gradient-index antireflection diffractive optics", Optics Letters, vol. 36, No. 12, 15—Jun. 2011, p. 2354.

Qiaoyin Yang et al: "Antireflection effects at nanostructured material interfaces and the suppression of thin-film interference", Nanotechnology, vol. 24, No. 23, May 15, 2013, p. 235202.

Hemant Kumar Raut et al: "Anti-reflective coatings: A critical, in-depth review", Energy & Environmental Science, vol. 4, No. 10, Jan. 1, 2011, p. 3779.

R. J. Weiblen et al: "Optimized moth-eye anti-reflective structures for As_2S_3 chalcogentide optical fibers", Optics Express, vol. 24, No. 10, May 2, 2016 p. 10172.

\* cited by examiner

COMPACT HEAD-MOUNTED DISPLAY SYSTEM PROTECTED BY A HYPERFINE STRUCTURE

FIELD OF THE INVENTION

The present invention relates to substrate-guided optical devices, and particularly to devices which include a plurality of reflecting surfaces carried by a common light-transmissive substrate, also referred to as a light-guide element.

BACKGROUND OF THE INVENTION

One important application for compact optical elements is in head-mounted displays (HMDs), wherein an optical module serves both as an imaging lens and a combiner, wherein a two-dimensional image source is imaged to infinity and reflected into the eye of an observer. The display source can be obtained directly from either a spatial light modulator (SLM) such as a cathode ray tube (CRT), a liquid crystal display (LCD), an organic light emitting diode array (OLED), a scanning source or similar devices, or indirectly, by means of a relay lens or an optical fiber bundle. The display source comprises an array of elements (pixels) imaged to infinity by a collimating lens and is transmitted into the eye of the viewer by means of a reflecting or partially reflecting surface acting as a combiner for non-see-through and see-through applications, respectively. Typically, a conventional, free-space optical module is used for these purposes. As the desired field-of-view (FOV) of the system increases, however, such a conventional optical module becomes larger, heavier and bulkier, and therefore, even for a moderate performance device, such as a system, is impractical. This is a major drawback for all kinds of displays and especially in head-mounted applications, wherein the system should necessarily be as light and as compact as possible.

The strive for compactness has led to several different complex optical solutions, all of which on the one hand, are still not sufficiently compact for most practical applications, and on the other hand, suffer major drawbacks in terms of manufacturability. Furthermore, the eye-motion-box (EMB) of the optical viewing angles resulting from these designs is usually very small, typically less than 8 mm.

Hence, the performance of the optical system is very sensitive, even for small movements of the optical system relative to the eye of the viewer, and does not allow sufficient pupil motion for comfortable reading of text from such displays.

The teachings included in Publication Nos. WO 01/95027, WO 03/081320, WO 2005/024485, WO 2005/024491, WO 2005/024969, WO 2005/124427, WO 2006/013565, WO 2006/085309, WO 2006/085310, WO 2006/087709, WO 2007/054928, WO 2007/093983, WO 2008/023367, WO 2008/129539, WO 2008/149339, WO 2013/175465 and IL 232197, all in the name of Applicant, are herein incorporated by reference.

DISCLOSURE OF THE INVENTION

The present invention facilitates the exploitation of a very compact light-guide optical element (LOE) for, amongst other applications, HMDs. The invention allows relatively wide FOVs together with relatively large EMB values. The resulting optical system offers a large, high-quality image, which also accommodates large movements of the eye. The optical system offered by the present invention is particularly advantageous because it is substantially more compact than state-of-the-art implementations, and yet it can be readily incorporated, even into optical systems having specialized configurations.

A broad object of the present invention is therefore to alleviate the drawbacks of prior art compact optical display devices and to provide other optical components and systems having improved performance, according to specific requirements.

The invention can be implemented to advantage in a large number of imaging applications, such as portable DVDs, cellular phones, mobile TV receivers, video games, portable media players or any other mobile display devices.

The main physical principle of the LOE's operation is that light waves are trapped inside the substrate by total internal reflections from the external surfaces of the LOE. However, there are situations wherein it is required to attach another optical element to at least one of the external surfaces. In that case, it is essential to confirm that on the one hand, the reflection of light waves from the external surfaces will not be degraded by this attachment, and on the other hand, that the coupling-out and the coupling-in mechanisms of the light waves from and to the LOE will not be disturbed. As a result, it is required to add at the external surfaces an angular sensitive reflective mechanism that will substantially reflect the entire light waves which are coupled inside the LOE and impinge on the surfaces at oblique angles, and substantially transmit the light waves which impinge on the surfaces close to a normal incidence.

In previous inventions (e.g., described in Publication WO 2005/024491), a reflective mechanism, wherein an angular sensitive thin film dielectric coating is applied to the surfaces of the LOE, has been illustrated. According to the present invention, an alternative reflective mechanism that utilizes an air gap film, which comprises a moth-eye structure, is presented. Moths' eyes have an unusual property: their surfaces are covered with a natural nanostructured film which eliminates reflections. This allows the moth to see well in the dark, without reflections, which give its location away to predators. The structure consists of a hexagonal pattern of bumps, each roughly 200 nm high and their centers are spaced apart about 300 nm. This kind of anti-reflective coating works because the bumps are smaller than the wavelength of visible light, so the light "sees" the surface as having a continuous refractive index gradient between the air and the medium, which decreases reflection by effectively removing the air-lens interface. Practical anti-reflective films have been made by humans using this effect, being a form of bio-mimiery. Moth eye replicas show that reflectance for normally incident light is virtually completely eliminated for these structures. Optical modeling and experiments with other shapes and dimensions of such dense uneven hyperfine periodic structures prove that it is possible to suppress reflection in wider wavelength range (from UV to IR) and wider light incidence angles (0±60 degrees).

According to the present invention the moth-eye film, or any similar hyperfine structure, is not utilized as anti-reflection film. Instead, the special hyperfine structure is exploited as the required angular sensitive reflective mechanism. When it is required to attach an optical element to the external surface of the LOE, an air gap film is cemented to the optical element such that the hyperfine structure faces the LOE after the attachment. Therefore, when the coupled-in light waves inside the LOE impinge on the hyperfine structure at different oblique angles, they "see" only the external part of the periodic structure. The actual refractive index, which is "seen" by the incoming optical light waves is, therefore, close to the refractive index of the air, and the total internal reflection mechanism is preserved. On the other hand, the air gap film is substantially transparent to the incoming light waves from the external scene or to the light waves which are coupled out from the LOE.

The invention therefore provides an optical system, including a light-transmitting substrate having at least two external major surfaces and edges, an optical element for coupling light waves into the substrate by internal reflection, at least one partially reflecting surface located in the substrate, for coupling light waves out of the substrate, at least one transparent air gap film including a base and a hyperfine structure defining a relief formation, constructed on the base, wherein the air gap film is attached to one of the major surfaces of the substrate, with the relief formation facing the substrate defining an interface plane, so that the light waves coupled inside the substrate are substantially totally reflected from the interface plane.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a side view of an exemplary, prior art LOE;

FIG. 2 is a schematic diagram illustrating a prior art optical device for collimating input light-waves from a display light source;

FIG. 3 is a schematic diagram illustrating a prior art system for collimating and coupling-in input light-waves from a display light source into an LOE;

FIG. 4 is a schematic diagram illustrating another prior art system for collimating and coupling-in input light-waves from a display light source into a substrate, wherein the collimating module is attached to the substrate;

FIG. 5 illustrates an exemplary embodiment of the present invention, wherein a negative lens is attached to an external surface of the light-guide optical element, in accordance with the present invention;

FIG. 6 illustrates an exemplary embodiment of the present invention, wherein negative and positive lenses are attached to the external surfaces of the light-guide optical element, in accordance with the present invention;

FIGS. 7a and 7b are two- and three-dimensional schematic views of an exemplary embodiment of an air gap film, wherein a hyper-fine periodic structure of transparent dielectric material arranged at a small pitch shorter than the wavelengths of the photopic region, is constructed on a flat transparent substrate;

Figure 8A:
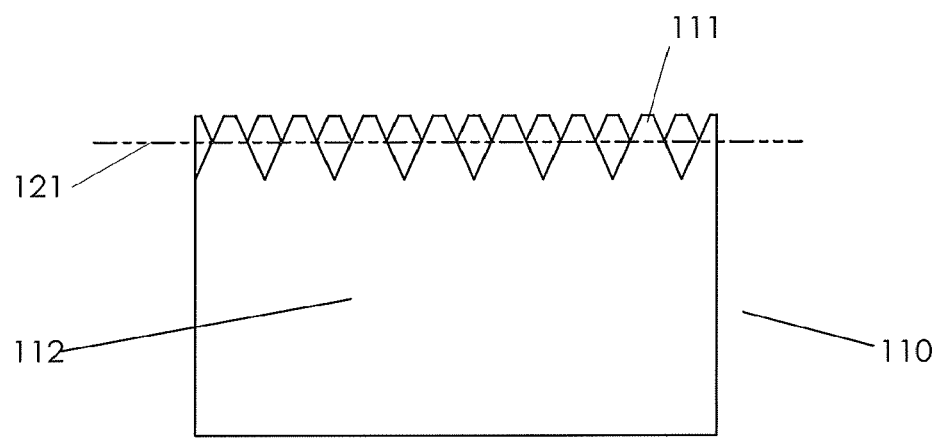
Figure 8B:
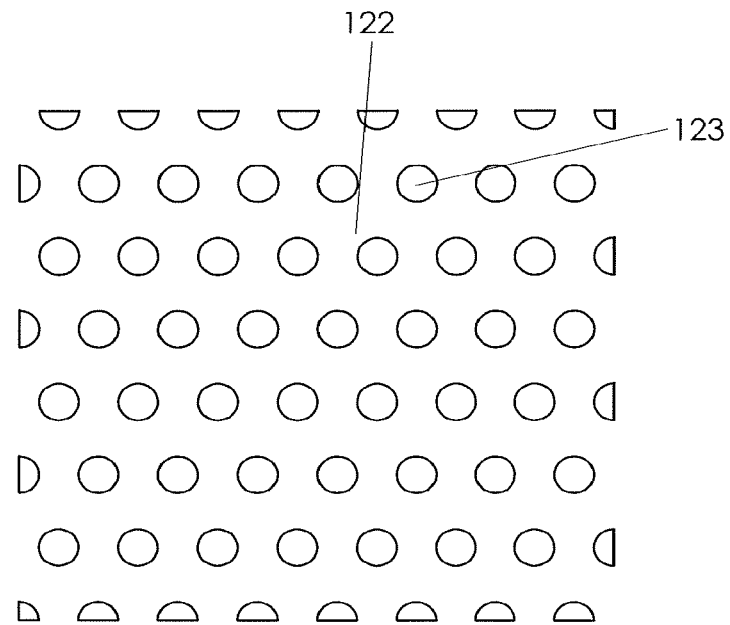
Figure 9A:
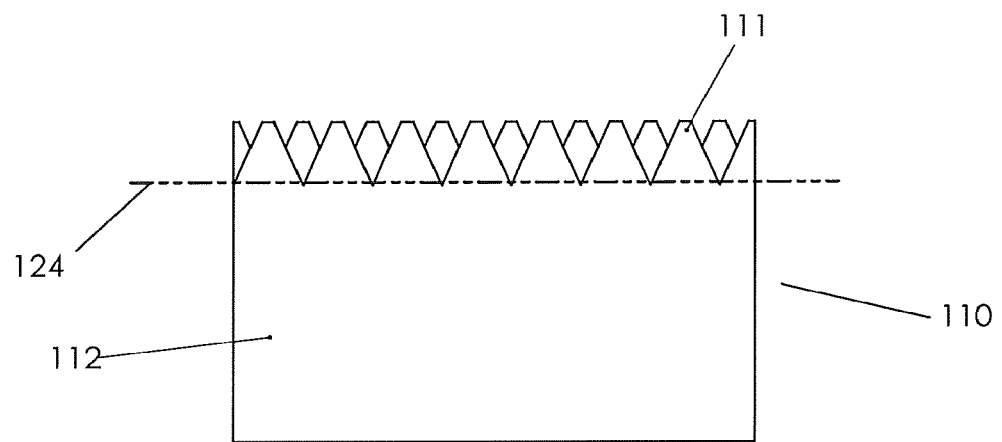
Figure 9B:
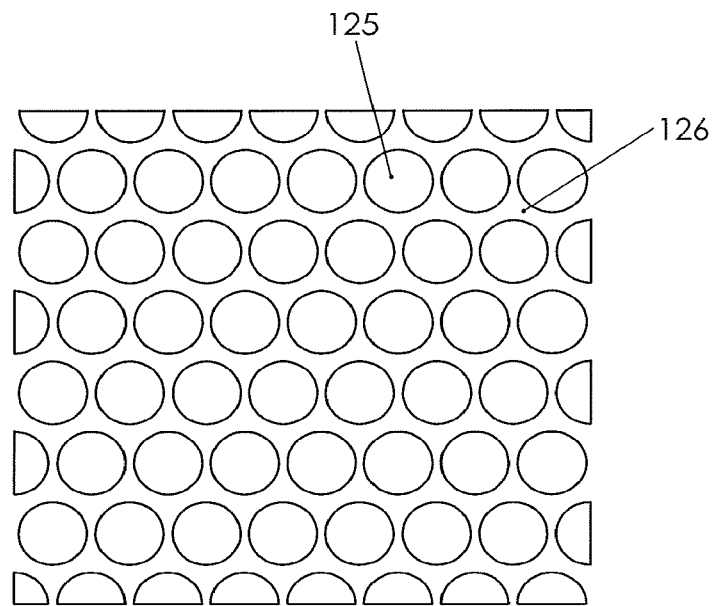
Figure 10A:
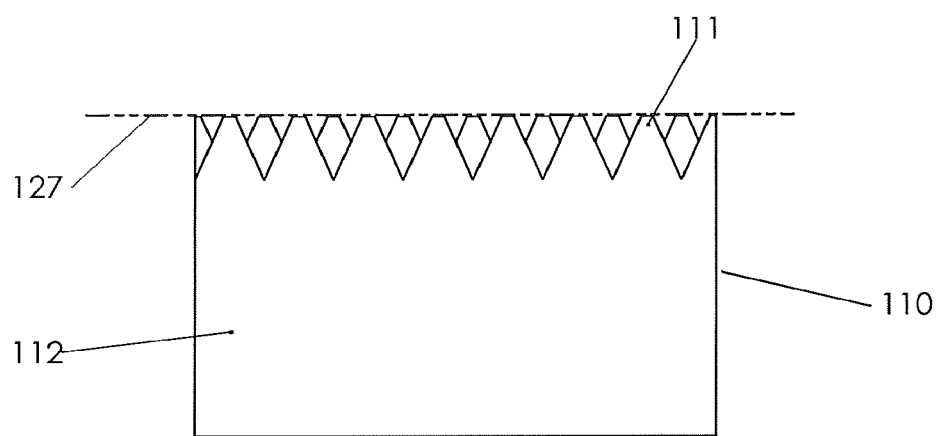
Figure 10B:
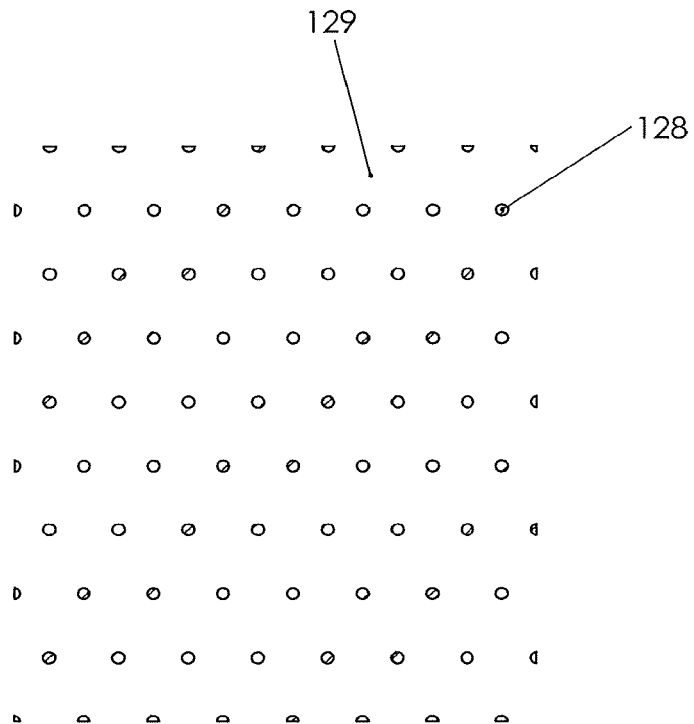
Figure 11:
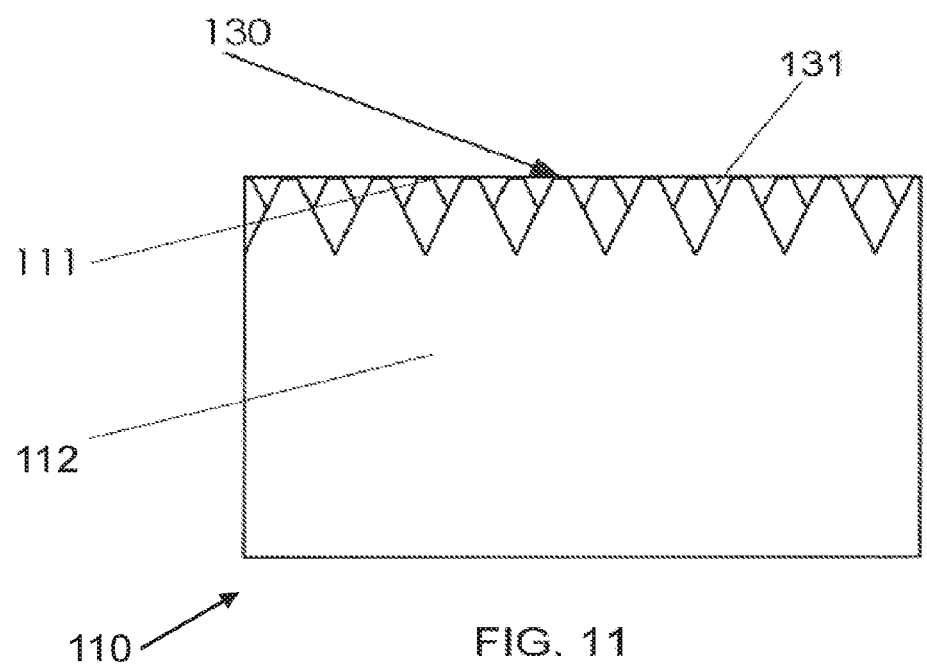
Figure 12:
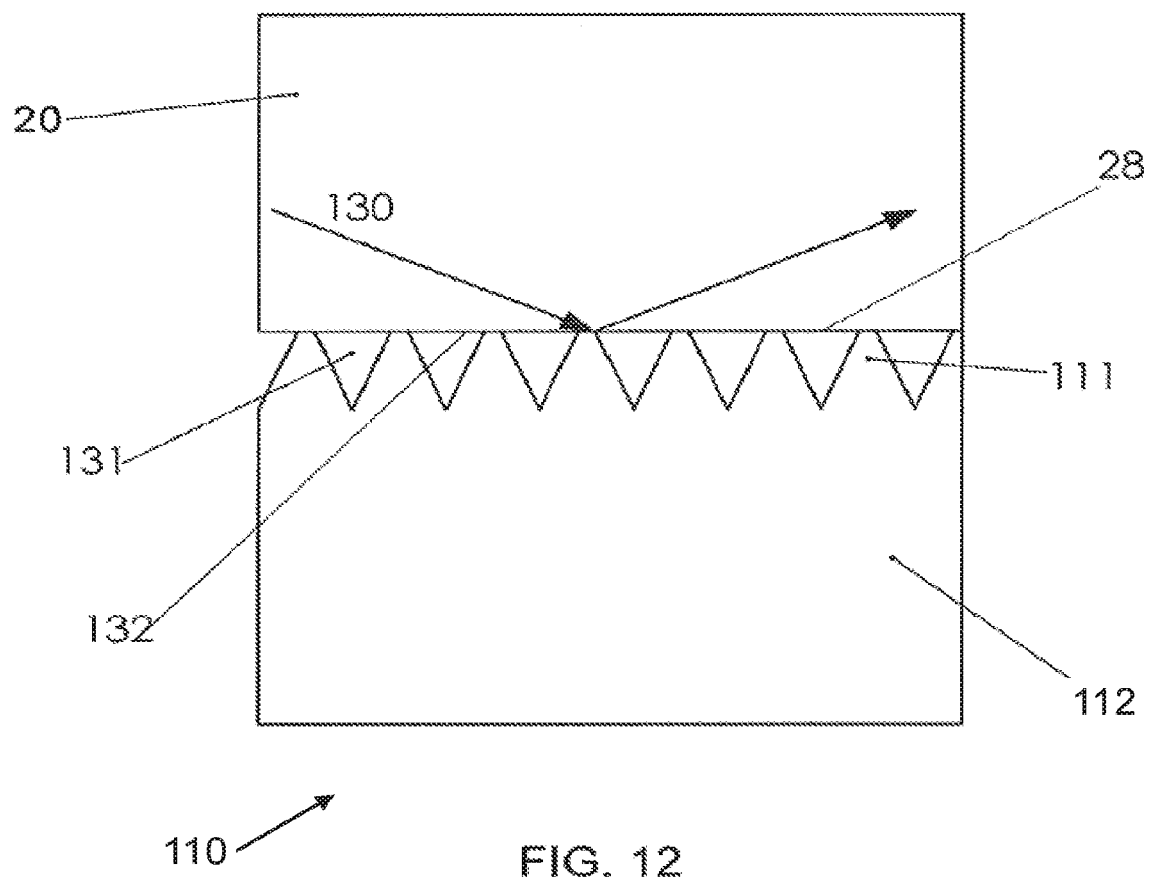
Figure 13A:
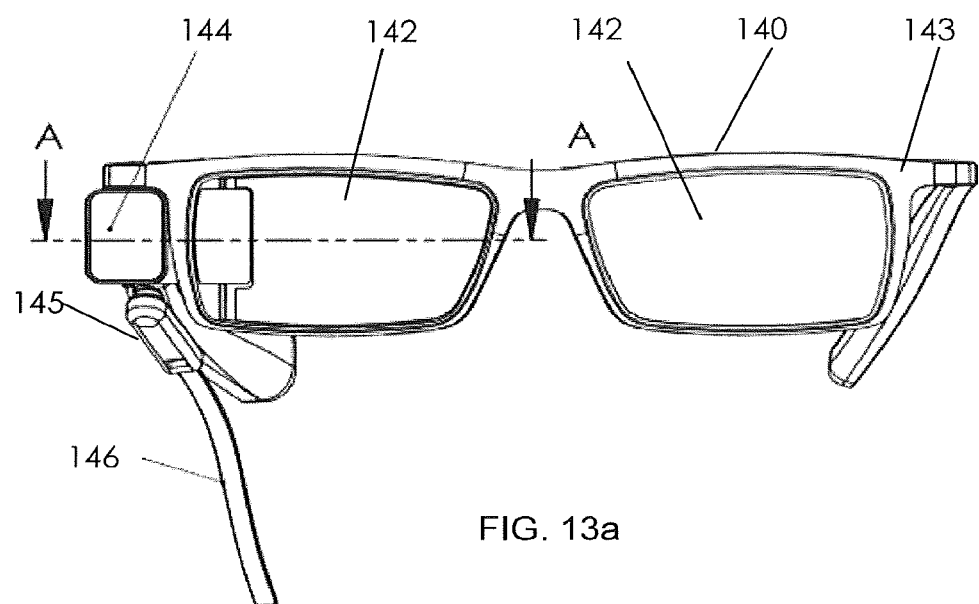
Figure 13B:
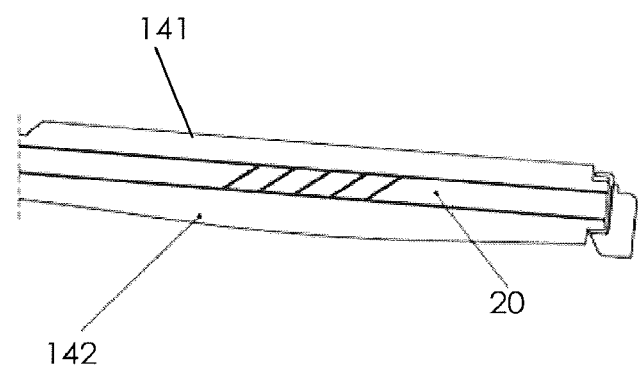
Figure 14A:
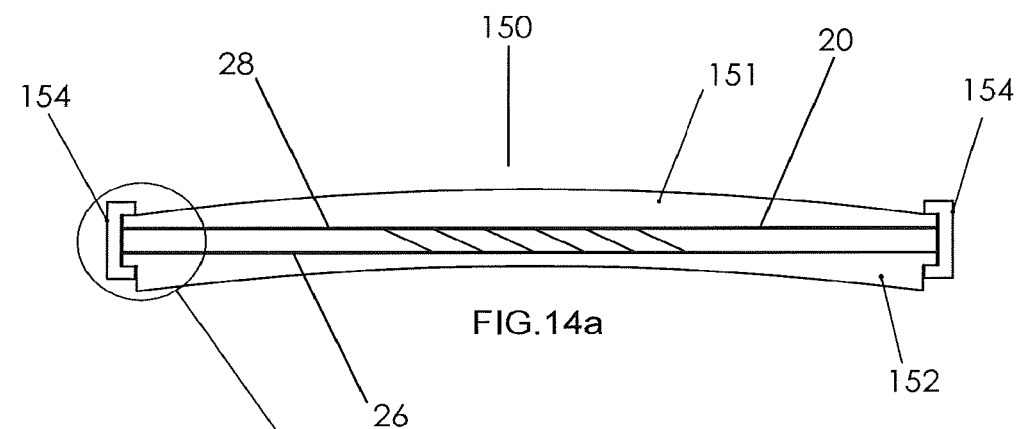
Figure 14B:
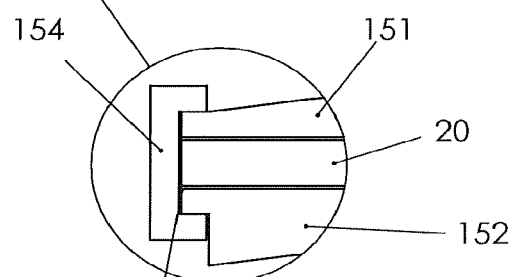
Figure 14C:
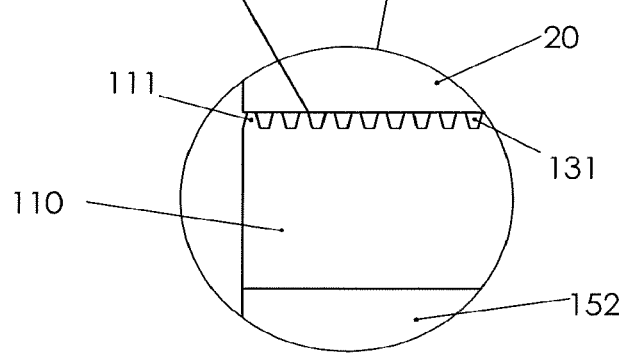
Figure 15A:
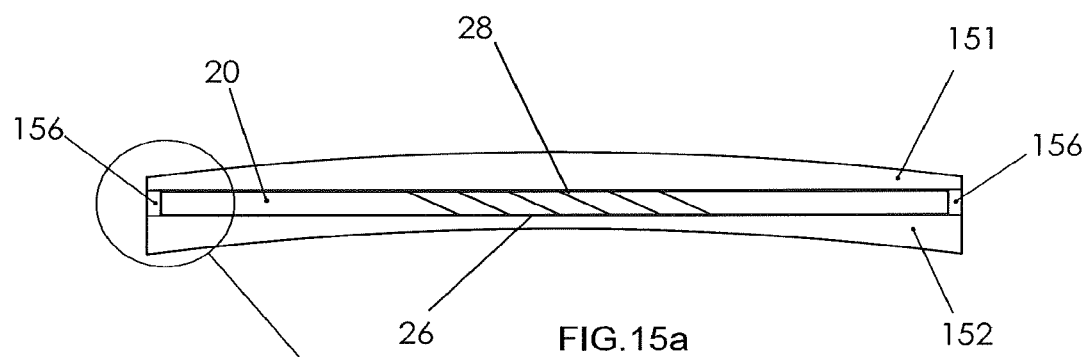
Figure 15B:
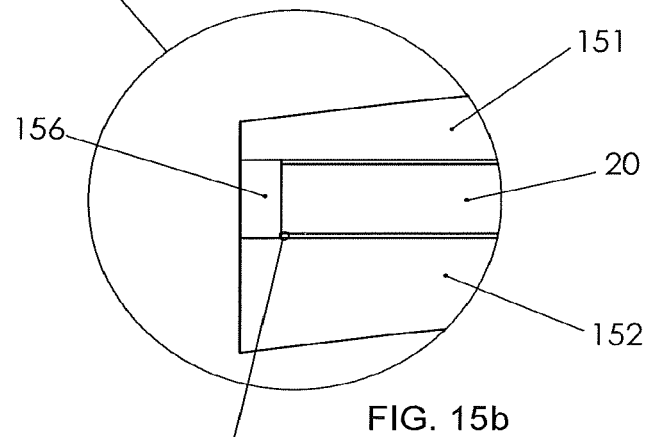
Figure 15C:
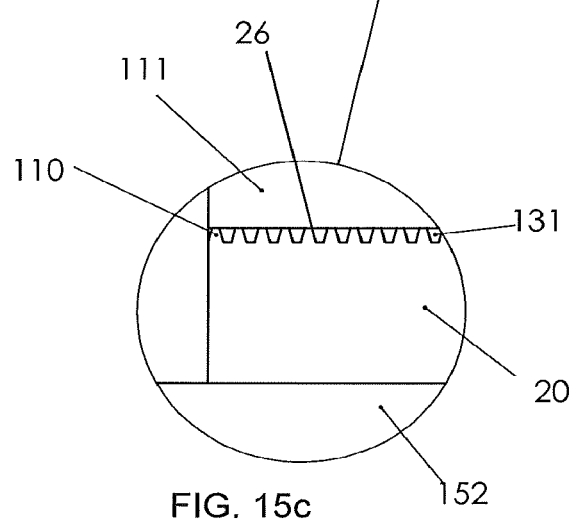
Figure 16A:
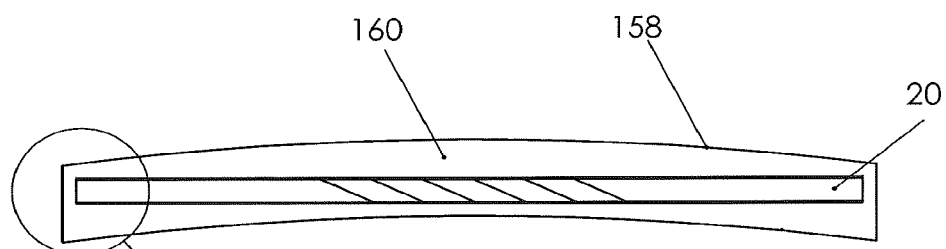
Figure 16B:
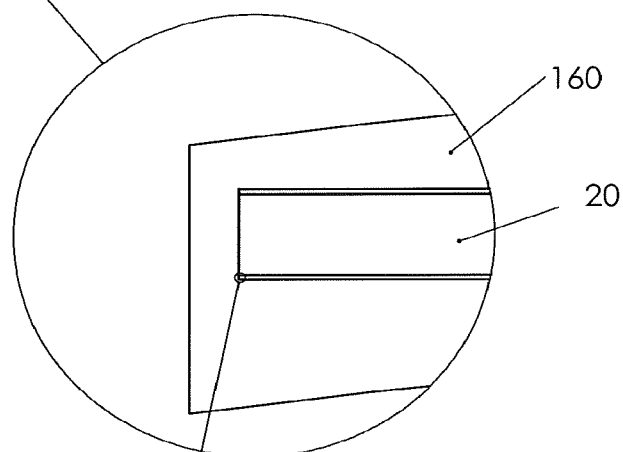
Figure 16C:
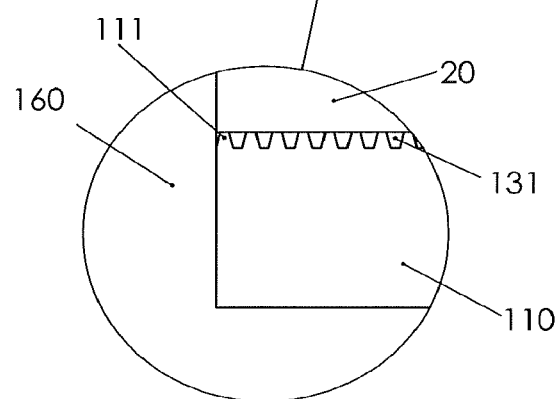
Figure 17A:
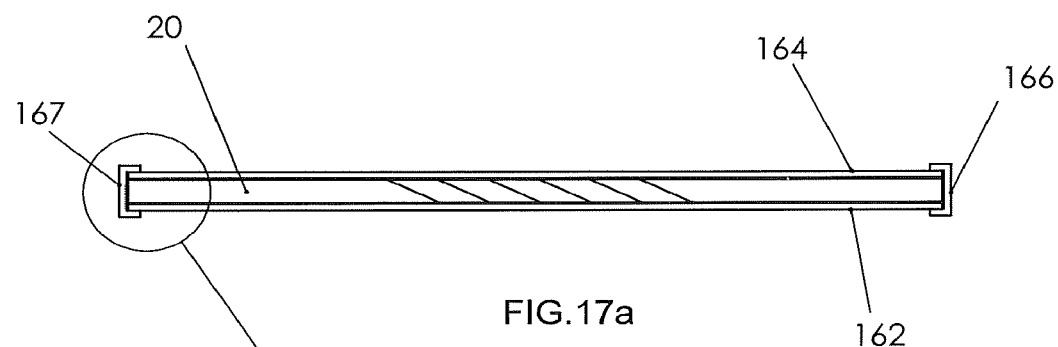
Figure 17B:
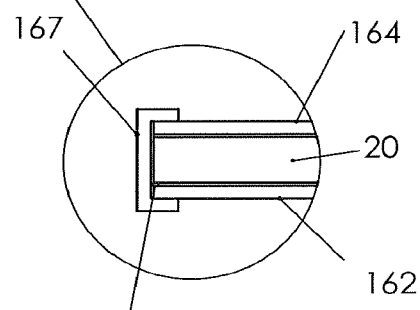
Figure 17C:
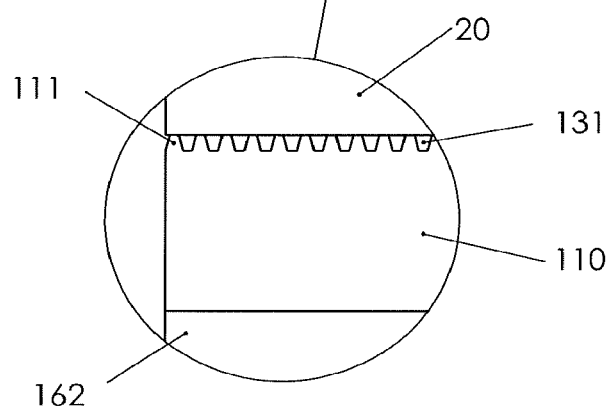

FIGS. 8a and 8b respectively illustrate a side view and a top view of an exemplary air gap film;

FIGS. 9a and 9b respectively illustrate a side view and a top view of an exemplary air gap film for an internal cross section which is close to the base;

FIGS. 10a and 10b respectively illustrate a side view and a top view of an exemplary air gap film for an external cross section which is close to the air;

FIG. 11 illustrates a side view of a light wave impinging on the upper side of a hyperfine structure at an oblique angle, in accordance with the present invention;

FIG. 12 illustrates an air-gap film which is attached to the external surface of an LOE, wherein a coupled light wave impinges on the interface surface between the LOE and the film, in accordance with the present invention;

FIGS. 13a and 13b respectively illustrate a front view of an eyeglasses system and a top view of an LOE embedded between two optical lenses and assembled inside the eyeglasses frame, in accordance with the present invention;

FIGS. 14a, 14b and 14c respectively illustrate a non-monolithic optical element comprising an LOE embedded between a front positive lens and a rear negative lens, mounted together inside a frame without adhesive, in accordance with the present invention;

FIGS. 15a, 15b and 15c respectively illustrate an alternative method for embedding an LOE between two optical lenses, utilizing a peripheral bonding technique, in accordance with the present invention;

FIGS. 16a, 16b and 16c respectively illustrate an alternative method for monolithically embedding an LOE between two optical lenses, in accordance with the present invention, and FIGS. 17a, 17b and 17c respectively illustrate an LOE embedded between two flat substrates and assembled inside a frame, in accordance with the present invention.

Figure 18:
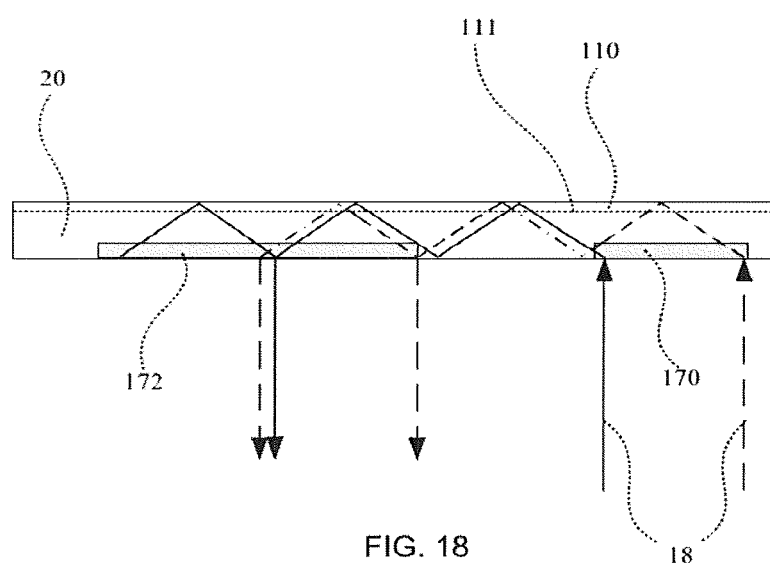
Figure 19:
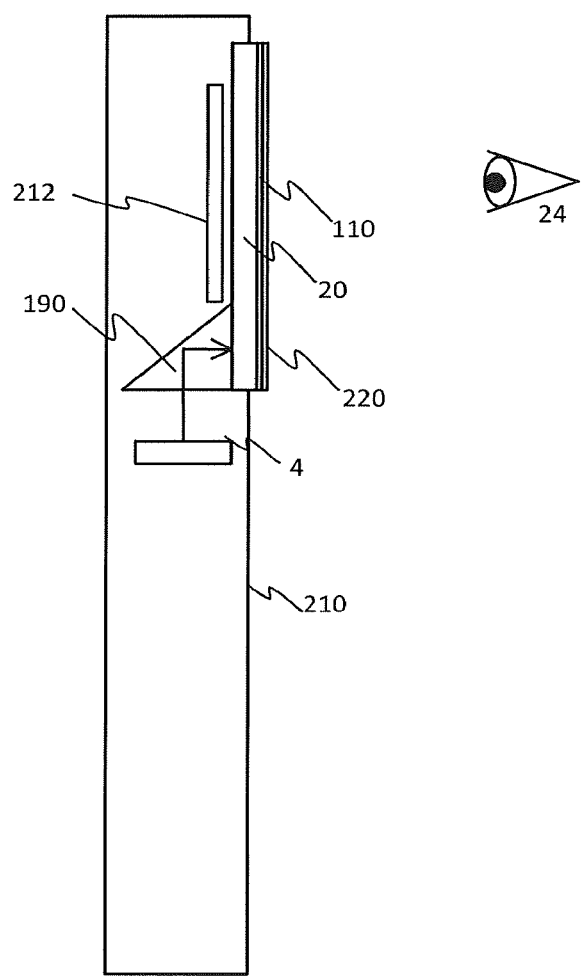

FIG. 18 illustrates an exemplary embodiment of the present invention, wherein the coupling-in as well as the coupling-out elements are diffractive optical elements, and FIG. 19 illustrates an exemplary embodiment of the present invention, wherein the optical module is embedded in a hand-carried display system.

DETAILED DESCRIPTION OF EMBODIMENTS

Figure 1:
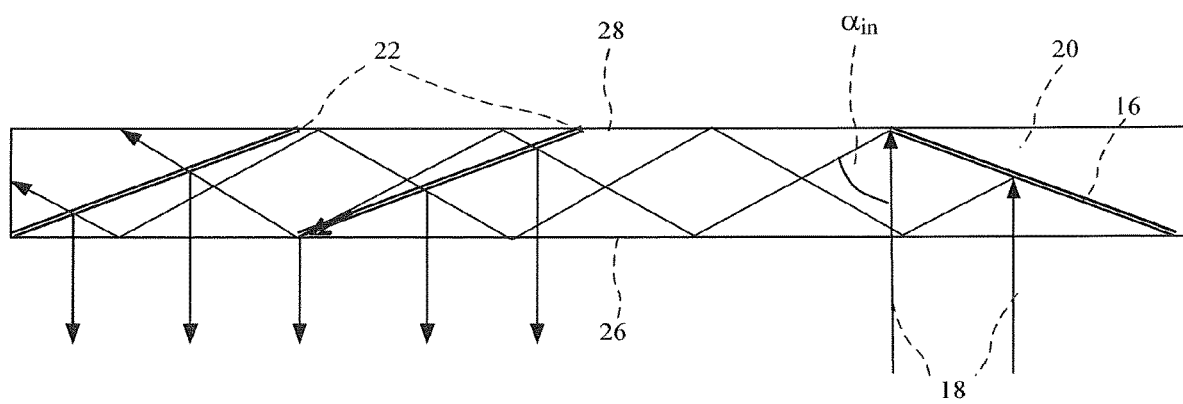

FIG. 1 illustrates a sectional view of a prior art optical system including a planar substrate 20 and associated components (hereinafter also referred to as an "LOE"), utilizable in the present invention. An optical means, e.g., a reflecting surface 16, is illuminated by light waves 18, which are collimated from a display of a light source (not shown). The reflecting surface 16 reflects incident light waves from the source, such that the light waves are trapped inside the planar substrate 20 of the LOE, by total internal reflection. After several reflections of the major lower and upper surfaces 26, 28 of the substrate 20, the trapped waves reach an array of selective partially reflecting surfaces 22, which couple the light out of the substrate into a pupil 25 of an eye 24 of a viewer. Herein, the input surface of the LOE will be regarded as the surface through which the input light waves enter the LOE, and the output surface of the LOE will be regarded as the surface through which the trapped waves exit the LOE. In the case of the LOE illustrated in FIG. 1, both the input and the output surfaces are on the lower surface 26. Other configurations, however, are envisioned in which the input and the image waves could be located on opposite sides of the substrate 20, or when the light is coupled into the LOE through a slanted edge of the substrate.

Figure 2:
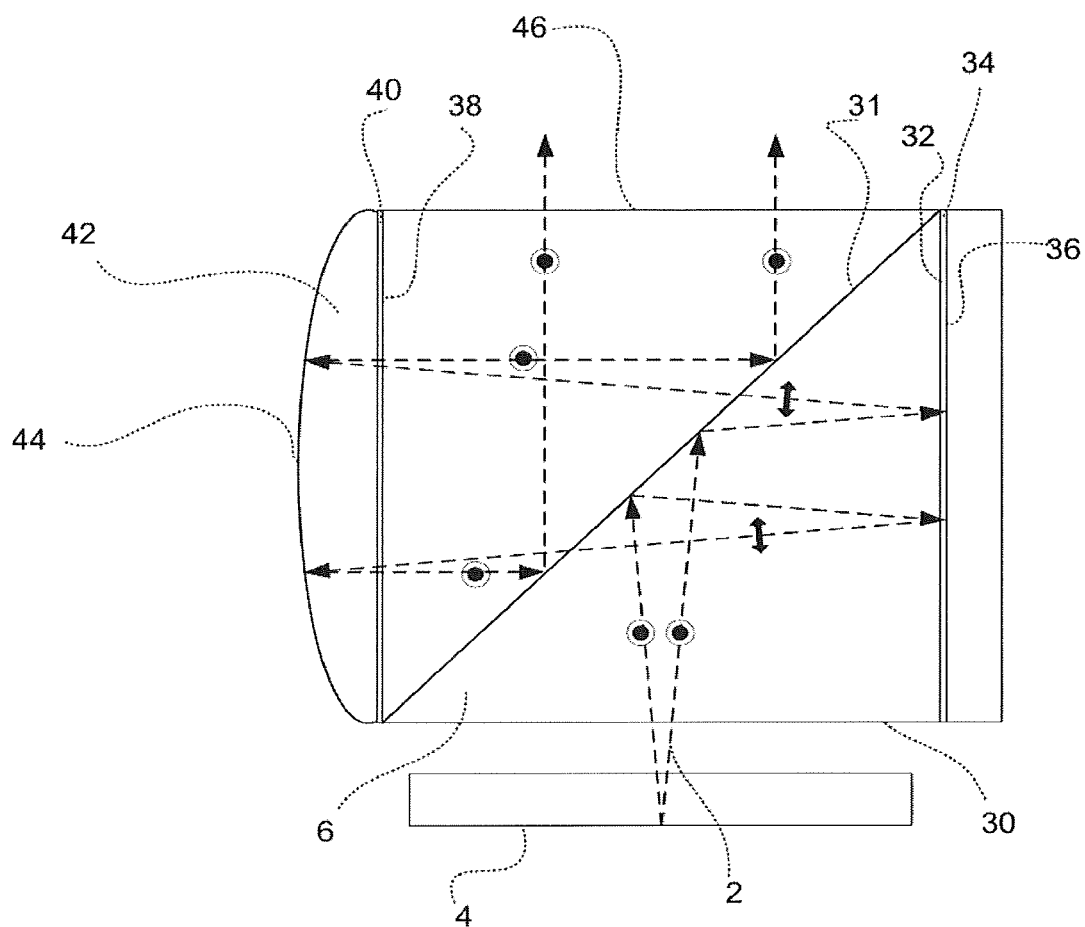

As illustrated in FIG. 2, the s-polarized input light-waves 2 from a display light source 4 are coupled into a collimating module 6 through its lower surface 30, which module is usually composed of a light-waves transmitting material. Following reflection-off of a polarizing beamsplitter 31, the light-waves are coupled-out of the substrate through surface 32 of the collimating module 6. The light-waves then pass through a quarter-wavelength retardation plate 34, reflected by a reflecting optical element 36, e.g., a flat mirror, return to pass again through the retardation plate 34, and re-enter the collimating module 6 through surface 32. The now p-polarized light-waves pass through the polarizing beamsplitter 31 and are coupled out of the light-guide through surface 38 of the collimating module 6. The light-waves then pass through a second quarter-wavelength retardation plate 40, collimated by a component 42, e.g., a lens, at its reflecting surface 44, return to pass again through the retardation plate 34, and re-enter the collimating module 6 through surface 38. The now s-polarized light-waves reflect off the polarizing beamsplitter 31 and exit the collimating module through the upper surface 46. The reflecting surfaces 36 and 44 can be materialized either by a metallic or a dielectric coating.

Figure 3:
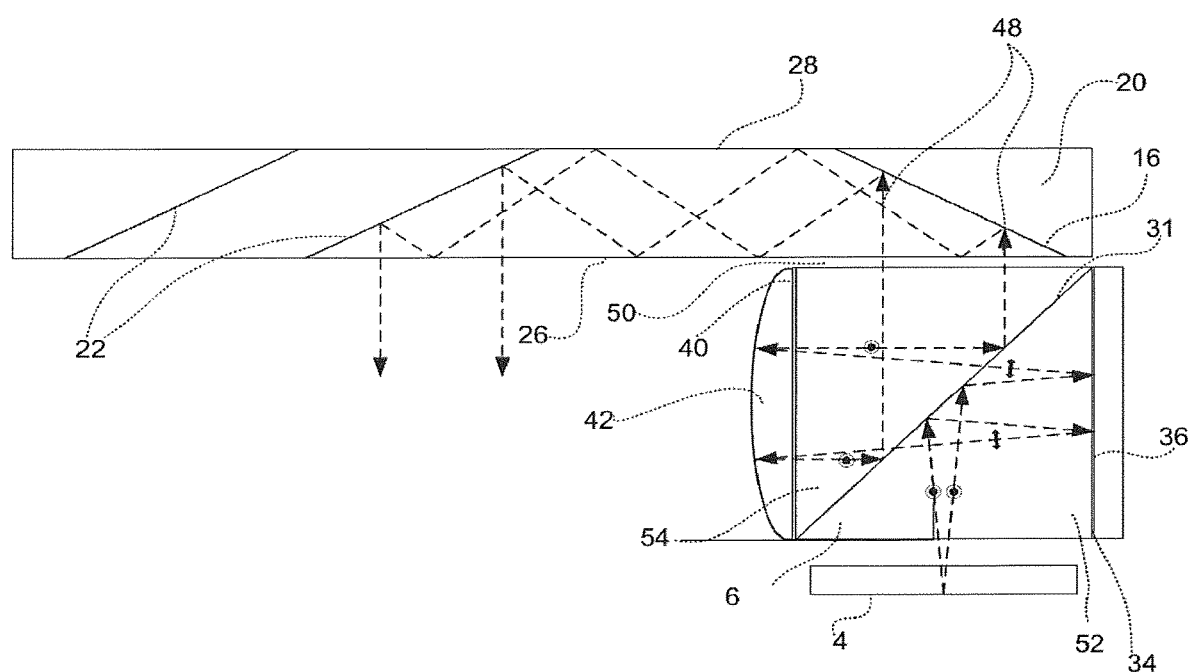

FIG. 3 illustrates how a collimating module 6, constituted by the components detailed with respect to FIG. 2, can be combined with a substrate 20, to form an optical system. The output light-waves 48 from the collimating module 6 enter the substrate 20 through its lower surface 26. The light waves entering the substrate 20 are reflected from optical element 16 and trapped in the substrate, as illustrated in FIG. 2. Now, the collimating module 6, comprising the display light source 4, the folding prisms 52 and 54, the polarizing beamsplitter 31, the retardation plates 34 and 40 and the reflecting optical elements 36 and 42, can easily be integrated into a single mechanical module and assembled independently of the substrate, even with non-accurate mechanical tolerances. In addition, the retardation plates 34 and 40 and the reflecting optical elements 36 and 42 could be cemented together, respectively, to form single elements.

Figure 4:
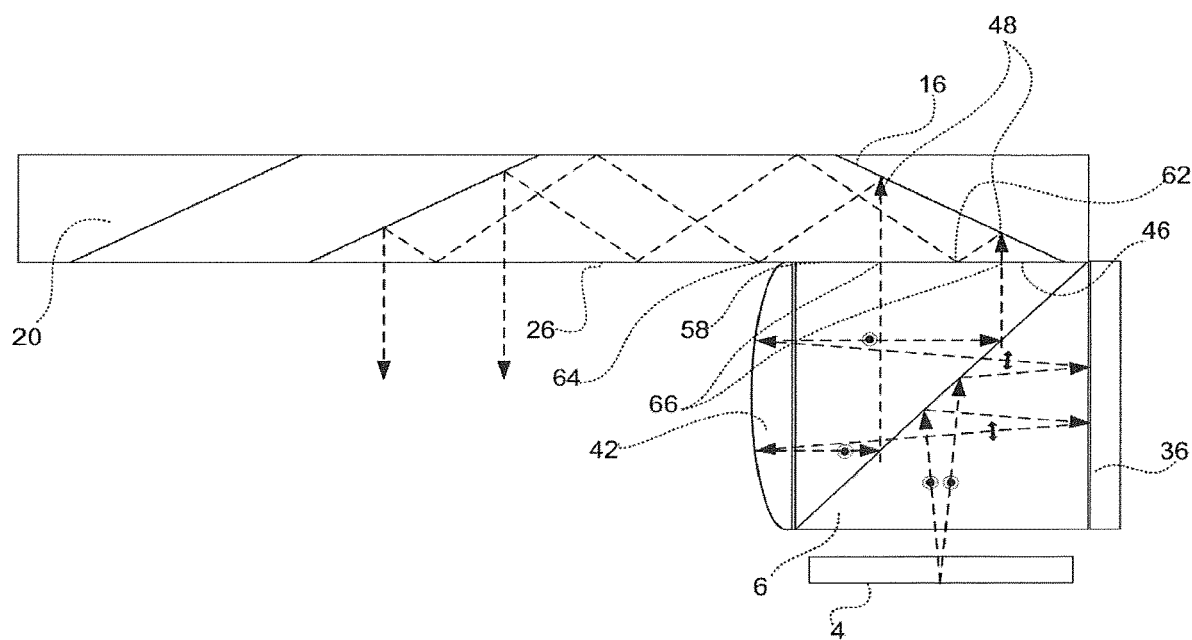

It would be advantageous to attach all the various components of the collimating module 6 to the substrate 20, to form a single compact element resulting in a simplified mechanical module. FIG. 4 illustrates such a module, wherein the upper surface 46 of the collimating module 6 is attached at the interface plane 58, to the lower surface 26 of the substrate 20. The main problem of this configuration is that the attaching procedure cancels the previously existing air gap 50 (illustrated in FIG. 3) between the substrate 20 and the collimating module 6. This air gap is essential for trapping the input light waves 48 inside the substrate 20. The trapped light waves 48 should be reflected at points 62 and 64 of the interface plane 58. Therefore, a reflecting mechanism should be applied at this plane, either at the major surface 26 of the substrate 20, or at the upper surface 46 of the collimating module 6. A simple reflecting coating cannot, however, be easily applied, since these surfaces should also be transparent to the light waves that enter and exit the substrate 20 at the exemplary points 66. The light waves should pass through plane 48 at small incident angles, and reflect at higher incident angles. Usually, the passing incident angles are between 0° and 15° and the reflecting incident angles are between 40° and 80°.

Figure 5:
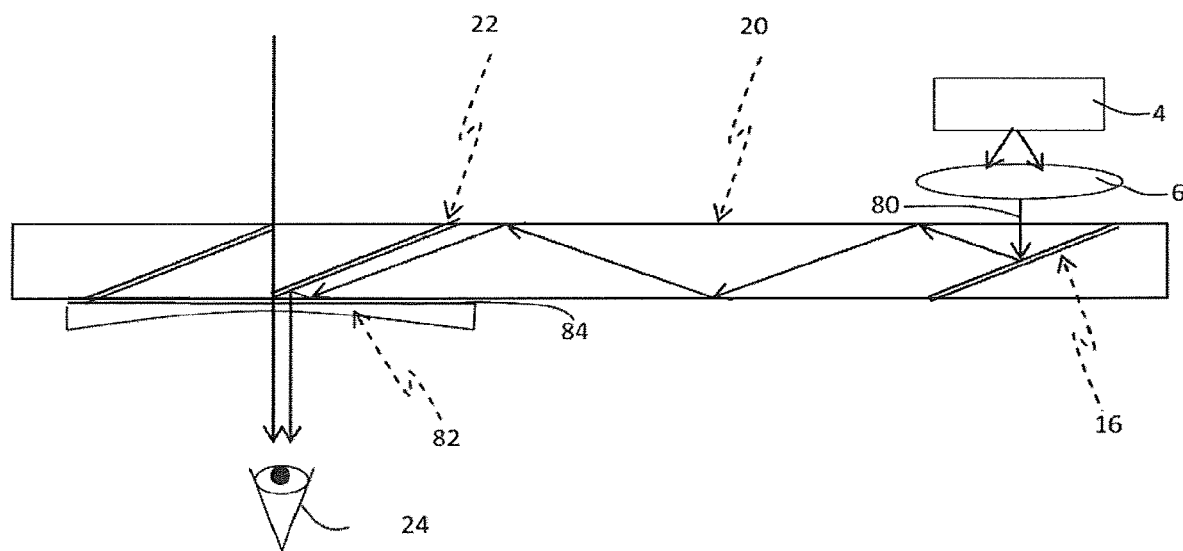

In the above-described embodiments of the present invention, the image which is coupled into the LOE is collimated to infinity. There are applications, however, where the transmitted image should be focused to a closer distance, for example, for people who suffer from myopia and cannot properly see images located at long distances. FIG. 5 illustrates an optical system utilizing a lens, according to the present invention. An image 80 from infinity is coupled into a substrate 20 by a reflecting surface 16, and then reflected by an array of partially reflective surfaces 22 into the eye 24 of the viewer. The (plano-concave) lens 82 focuses the images to a convenient distance and optionally corrects other aberrations of the viewer's eye, including astigmatism. The lens 82 can be attached to the surface of the substrate at its flat surface 84. As explained above with regard to FIG. 4, a thin air gap must be preserved between the lens and the substrate, to ensure the trapping of the image light waves 80 inside the substrate by total internal reflection.

Figure 6:
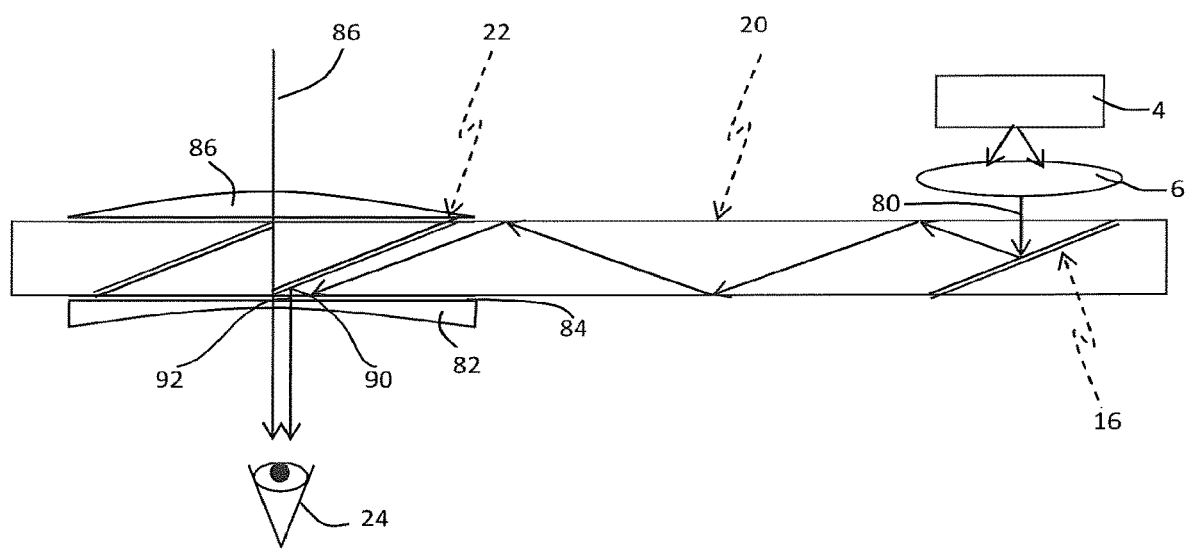

In addition, in most of the applications related to the present invention, it is assumed that the external scene is located at infinity; however, there are professional or medical applications where the external scene is located at closer distances. FIG. 6 illustrates an optical system for implementing a dual lens configuration, based on the present invention. Image light waves 80 from infinity are coupled into a substrate 20 by a reflecting surface 16 and then reflected by an array of partially reflective surfaces 22 into the eye 24 of the viewer. Another image 86 from a close distance scene is collimated to infinity by a lens 88 and then passed through the substrate 20 into the eye 24 of a viewer. The lens 82 focuses images 80 and 86 to a convenient distance, usually (but not necessarily always) the original distance of the external scene image, and corrects other aberrations of the viewer's eye, if required.

The lenses 82 and 88 shown in FIGS. 5 and 6 are simple plano-concave and plano-convex lenses, respectively, however, to keep the planar shape of the substrate, it is possible instead to utilize Fresnel lenses, which can be made of thin molded plastic plates with fine steps. Moreover, an alternative way to materialize the lenses 82 or 88, instead of utilizing fixed lenses as described above, is to use electronically controlled dynamic lenses. There are applications where the user will not only be able to see a non-collimated image but also to dynamically control the focus of the image. It has been shown that a high resolution, spatial light modulator (SLM) can be used to form a holographic element. Presently, the most popular sources for that purpose are LCD devices, but other dynamic SLM devices can be used as well. High resolution, dynamic lenses having several hundred lines/mm are known. This kind of electro-optically controlled lenses can be used as the desired dynamic elements in the present invention, instead of the fixed lenses described above in conjunction with FIGS. 5 and 6. Therefore, in real time, a user can determine and set the exact focal planes of both the virtual image projected by the substrate and the real image of the external view.

As illustrated in FIG. 6, it would be advantageous to attach the lenses 82 and 88 to the substrate 20, to form a single, compact simplified mechanical module. Clearly, the main problem as hereinbefore described, is that the attaching procedure cancels the previously existing air gap between the substrate 20 and the lenses 82 and 88, which gaps are essential for trapping image light waves 80 inside the substrate 20. The trapped image light waves 80 should be reflected at point 90 of the interface plane 84 and transmitted through the same plane at point 92. Therefore, a similar partially reflecting mechanism as described above in relation to FIG. 4 should be applied at this plane.

Figure 7A:
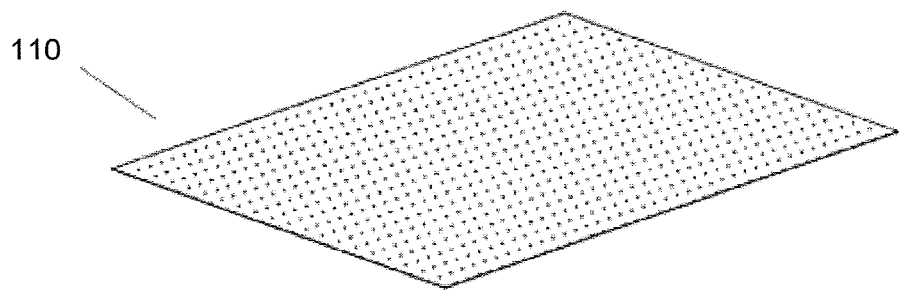
Figure 7B:
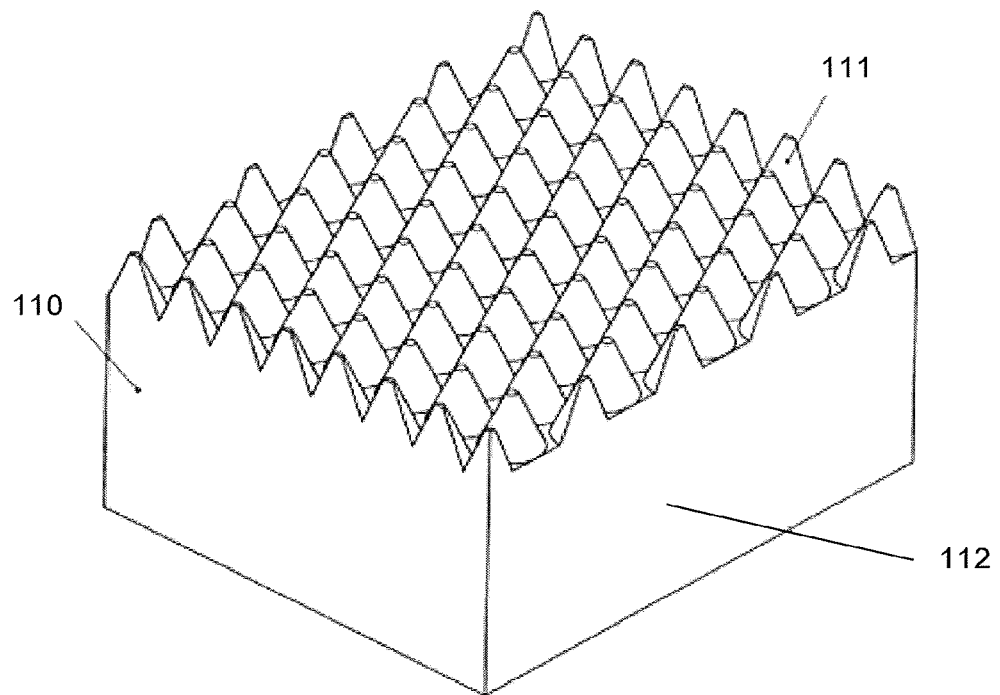

To achieve the required partially reflecting mechanism, it is possible to apply an angular sensitive thin film coating at the major surfaces of the substrate; however, the fabrication of this embodiment can be complicated and expensive. An alternative way for realizing the required partially reflecting mechanism is to attach a transparent air gap film 110 to the major surfaces of the substrate, as illustrated in FIGS. 7a and 7b. The term air gap film relates to an optical device which has on its surface a hyper-fine periodic structure 111 of transparent dielectric material arranged at a small pitch shorter than the wavelengths of the photopic region, e.g., an optical device such as moth-eye film having a dense (uneven) hyperfine periodic structure 111 (hereinafter referred to as "relief formation"), which is constructed on a flat transparent substrate 112 (hereinafter referred to as "base" 112 or "base film" 112). The height of the relief formation should preferably (but not necessarily always) be less than 1 micron.

As seen in FIGS. 8a, and 8b, any cross section 121 parallel to the surface of the air gap film 110 has a periodic formation, wherein the proportional portion of the dielectric material 123 in the relief formation is changed gradually as a function from the film itself.

As further seen in FIGS. 9a, 9b and 10a and 10b, in the internal cross section 124, which is close to the base film 112, i.e., the lower portion of the hyperfine structure 111, the proportional portion of the dielectric material 125 in the relief formation 126 is maximal and substantially close to 1, while in the external cross section 127, i.e., close to the upper portion of the hyperfine structure 111, the proportional portion of the dielectric material 128 in the relief formation 129 is minimal, namely, significantly lower than in material 125, and substantially equal to zero.

Typically, when light waves pass through an optical device having a periodic structure, diffraction of light occurs and the brightness of the zero order of the diffracted light, namely, the light which is transmitted through the device without any diffraction, is considerably reduced. When the pitch of the hyper-fine periodic structure is, however, considerably shorter than the wavelength of the incoming light waves, no diffraction occurs. Instead, since the optical waves "see" a medium having a refractive index which is the average of the materials contained in this medium, effective anti-reflection properties can be obtained.

On the other hand, as illustrated in FIG. 11, when the light waves 130 impinge on the periodic hyperfine structure 111 at the upper side of the structure at oblique angles, they "see" only the external part of the periodic structure, wherein the proportional part of the transparent material is very low. Therefore, the actual refractive index, which is "seen" by the incoming optical waves, is close to the refractive index of the air 131.

As a result, and as illustrated in FIG. 12, when such an air-gap film is attached to the external surface 28 of the substrate 20, the coupled light waves 130 impinge on the interface surface 132 between the substrate and the film at angles higher than the critical angle, the air 131 confined between the film and the substrate provides an optical isolation due to the air-like refractive index in the boundary surface. Therefore, the phenomena of total internal reflection of the coupled-in light waves from the external surface will be preserved and the light waves will be contained inside the substrate.

The geometrical characteristic of the hyperfine structure, such as the height, peak-to-peak and width thereof, can usually be between 10 to 800 nanometers. In addition, the exact shape and of the hyperfine structure should not necessarily be that of the moth eye. Any other nano-structure shape, such as pyramids, prisms, cones and others, can be utilized. Moreover, the hyperfine structure should not necessarily be specifically periodic, although a periodic structure is usually easier to fabricate. This hyperfine structure, however, should fulfill the following requirements: on one hand, the structure should be solid enough not to collapse during the attaching process and, on the other hand, the proportional portion of the dielectric material in the external cross-section of the structure, should be substantially equal to zero, to maintain the total internal reflection phenomena inside the substrate. In addition, the size of the basic elements of the hyperfine structure should not be too large, in order to avoid diffraction effects. Reducing the thickness of the hyperfine structure to below 100 nm, however, might undesirably allow the penetration of the trapped waves through the air gap film and the deterioration of the total internal reflection phenomena. As a result, a typical required value for the hyperfine structure thickness is between 200 and 300 nm.

FIG. 13a illustrates a front view of an eyeglasses system 140 and FIG. 13b a top view of a substrate 20 which is embedded between two optical lenses 141, 142 and assembled inside the eyeglasses frame 143. As seen, in addition to the optical elements, the frame can contain other accessories including a camera 144, a microphone 145, earphones 146, USB connectors, memory cards, an inertial measurement unit (IMU), and the like.

FIGS. 14a, 14b and 14c illustrate a non-monolithic optical element 150 comprising a substrate 20 embedded between front positive lens 151 and rear negative lens 152, mounted together inside a frame 154 without adhesive. Air gap films 110 (FIG. 14c) are placed or bonded between the substrate 20 and the lenses 151, 152, wherein the hyperfine structures 111, respectively face the external surfaces 26 and 28 of the substrate 20. The air gap films 110 can be directly cemented on the planar surfaces of the optical lenses 151 and 152 using pressure-sensitive adhesive (PSA), or can be fabricated directly as an integral part of the lenses utilizing embossing, injection molding, casting, machining, soft lithography or any other direct fabrication method. The embedded optical element 150 can be assembled inside the frame 154 utilizing pressure or cementing techniques.

An alternative method for monolithically embedding the substrate 20 between the two optical lenses is illustrated in FIGS. 15a, 15b and 15c. The substrate 20 is embedded between the optical lenses utilizing a peripheral bonding technique. The front lens 151 and rear lens 152 are cemented to the peripheral edges of the substrate 20 using non-optical adhesive or any other high-viscosity adhesive 156 that mount all components together. The viscosity of the adhesive should be high enough in order to prevent leakage of the adhesive into the air pockets 131, which are confined between the film 110 and the substrate 20. Such a leakage can eliminate the air gap which is required to preserve the total internal reflection of the light waves from the external surfaces of the substrate. The required adhesive 156 can, for example, be OP-67-LS or any room temperature vulcanization (RTV) silicone.

Another alternative method for monolithically embedding the substrate 20 between the two optical lenses is illustrated in FIGS. 16a, 16b and 16c. The production procedure of the embedded element is as follows: placing the air gap film 110, with the hyperfine structures 111 facing the external surfaces 26 and 28 of the substrate 20; utilizing attaching techniques such as static electricity; preparing a mold 160 having the required external shape of the element; inserting the substrate 20 into the mold; casting or injecting the polymer into the mold, curing the polymer by UV or by changing the polymer temperature, and finally, ejecting the embedded element from the mold. As explained above in relation to FIGS. 15a to 15c, it is also important that the hyperfine regions will be isolated from the injected material during the injection molding process, in order to prevent a leakage of the material into the air pockets 131 between the substrate 20 and the air gap film 110.

FIGS. 13a to 16c illustrate different methods for forming an optical component comprising a substrate embedded between two optical lenses, however, there are embodiments wherein it is required to attach planar elements to the external surfaces of the substrate. An example for such an embodiment is illustrated in FIG. 4, wherein the collimating element 6 is attached to the substrate 20. Other reasons for attaching a flat element to a substrate can be for mechanically protecting the substrate to enhance the user's eye-safety, or applying a coating on the external surface of the flat element to achieve various characteristics such as, photochromic response, scratch resistance, super-hydrophobicity, tinted (colored) view, polarization, anti-finger print, and the like.

A substrate 20 embedded between two flat substrates 162 and 164 and assembled inside frames 166, 167 is illustrated in FIGS. 17a, 17b and 17c. The embedding process of the substrate and the flat substrates 20 can be materialized utilizing mechanical attachment, peripheral cementing or monolithic fabrication. Embedding processes can include attaching only a single element to one of the external surfaces of the substrate or combining different elements, such as flat substrates as well as curved lenses.

In all the embodiments illustrated so far the element for coupling light waves out of the substrate is at least one flat partially reflecting surface located in said substrate, which is usually coated with a partially reflecting dielectric coating and is non-parallel to the major surfaces of said substrate. However, the special reflective mechanism according to the present invention can be exploited also for other coupling-out technologies. FIG. 18 illustrates a substrate 20, wherein the coupling-in element 170 or the coupling-out element 172 are diffractive elements. In addition, other coupling-out elements, such as a curved partially reflecting surface, and other means, can be used.

The embodiments of FIGS. 13-17 are just examples illustrating the simple implementation of the present invention. Since the substrate-guided optical element, constituting the core of the system, is very compact and lightweight, it could be installed in a vast variety of arrangements. Many other embodiments are also possible, including a visor, a folding display, a monocle, and many more. This embodiment is designated for applications where the display should be near-to-eye; head-mounted, head-worn or head-carried. There are, however, applications where the display is located differently. An example of such an application is a hand-carried device for mobile application, such as, for example, a smartphone or smartwatch. The main problem of these smart devices is the contradiction between the required small size and volume and the desired high quality image.

FIG. 19 illustrates an alternative method, based on the present invention, which eliminates the current necessary compromise between the small size of mobile devices and the desire to view digital content on a full format display. This application is a hand-held display (HHD) which resolves the previously opposing requirements, of achieving small mobile devices, and the desire to view digital content on a full format display, by projecting high quality images directly into the eye of the user. An optical module including the display source 4, the folding and collimating optics 190 and the substrate 20 is integrated into the body of a smart device 210, where the substrate 20 replaces the existing protective cover-window of the phone. Specifically, the volume of the support components, including source 4 and optics 190, is sufficiently small to fit inside the acceptable volume for modern smart device. In order to view the full screen, transmitted by the device, the window of the device is positioned in front of the user's eye 24, observing the image with high FOV, a large eye-motion-box and a comfortable eye-relief. It is also possible to view the entire FOV at a larger eye-relief by tilting the device to display different portions of the image. Furthermore, since the optical module can operate in see-through configuration, a dual operation of the device is possible; namely there is an option to maintain the conventional display 212 intact. In this manner, the standard display can be viewed through the substrate 20 when the display source 4 is shut-off. In a second, virtual-mode, designated for massive internet surfing, or high quality video operations, the conventional display 212 is shut-off, while the display source 4 projects the required wide FOV image into the eye of the viewer through the substrate 20. Usually, in most of the hand-carried smart devices, the user can operate the smart device by using a touchscreen which is embedded on the front window of the device. As illustrated in FIG. 19, the touchscreen 220 can be attached to a smart device by directly cementing it on the external surface air gap films 110, which is located on the substrate 20.

The invention claimed is:

1. An optical system, comprising:
    a light-transmitting substrate having a plurality of surfaces including at least a first and a second major external surface, the light-transmitting substrate configured to guide coupled-in light waves indicative of a scene image between the major external surfaces of the light-transmitting substrate by internal reflection, and the light-transmitting substrate further configured to couple the light waves out of the light-transmitting substrate;
    a lens arrangement external to the light-transmitting substrate including at least a first lens located next to one of the major external surfaces of the light-transmitting substrate, the first lens focusing at least one image, corresponding to at least one of light waves passed through the light-transmitting substrate, and the light waves guided between the major external surfaces of the light-transmitting substrate, to at least one distance for viewing by an eye of a viewer; and
    at least one transparent air gap film including a base and a hyperfine structure constructed on the base, the hyperfine structure defining a relief formation and having a pitch shorter than wavelengths of the light waves guided between the major external surfaces of the light-transmitting substrate, wherein the air gap film is deployed with the base optically coupled to a portion of the first lens and the relief formation facing one of the major external surfaces of the light-transmitting substrate to define an interface plane, and wherein the light waves coupled inside the light-transmitting substrate, impinging on the major external surfaces of the light-transmitting substrate at oblique angles, are internally reflected from the interface plane.

2. The optical system of claim 1, wherein the first lens is dynamically controlled.

3. The optical system of claim 1, wherein the at least one image is focused by the first lens to a user-controlled distance.

4. The optical system of claim 1, wherein the first lens is electronically controlled.

5. The optical system of claim 1, wherein the at least one image focused by the first lens is the scene image corresponding to the light waves guided between the major external surfaces of the light-transmitting substrate.

6. The optical system of claim 1, wherein the at least one image focused by the first lens is an external scene image, different from the scene image, corresponding to light waves passed through the light-transmitting substrate.

7. The optical system of claim 1, wherein the at least one image focused by the first lens includes the scene image, corresponding to the light waves guided between the major external surfaces of the light-transmitting substrate, and an external scene image, different from the scene image, corresponding to light waves passed through the light-transmitting substrate.

8. The optical system of claim 1, wherein the first lens is electro-optically controlled.

9. The optical system of claim 1, wherein the lens arrangement further includes a second lens located next to the other of the major external surfaces of the light-transmitting substrate for passing light waves from an external scene image, different from the scene image, through the light-transmitting substrate, and subsequently through the first lens, into the eye of the viewer.

10. The optical system of claim 9, further comprising a second transparent air gap film, the second air gap film deployed with the base of the second transparent air gap film optically coupled to a portion of the second lens and the relief formation of the second transparent air gap film facing the other of the major external surfaces of the light-transmitting substrate.

11. The optical system of claim 9, wherein the scene image and the external scene image are focused by the first lens to a user-controlled distance.

12. The optical system of claim 9, wherein the scene image is focused by the first lens to a predefined distance, wherein the predefined distance is the distance between the external scene image and the optical system.

13. The optical system of claim 9, wherein at least one of the first lens and the second lens is a dynamic lens.

14. The optical system of claim 13, wherein the dynamic lens is electronically controlled.

15. The optical system of claim 9, wherein at least one of the first lens and the second lens is a Fresnel lens.

16. The optical system of claim 1, wherein the light waves coupled inside the light-transmitting substrate are coupled-out through the interface plane at angles substantially normal to the interface plane.

17. The optical system of claim 1, wherein the air gap film includes at least one air gap formed between the relief formation and the substrate.

18. The optical system of claim 1, wherein a proportional portion of the relief formation at a cross section parallel to the base, gradually changes as a function of the distance of the cross section from the base.

19. The optical system of claim 1, wherein the hyperfine structure includes a periodic structure.

20. The optical system of claim 1, wherein the relief formation is mechanically positioned to define the interface plane with the light-transmitting substrate.

21. An optical system, comprising:
a light-transmitting substrate having a plurality of surfaces including at least a first and a second major external surface, the light-transmitting substrate configured to guide coupled-in light waves indicative of a scene image between the major external surfaces of the light-transmitting substrate by internal reflection, and the light-transmitting substrate further configured to couple the light waves out of the light-transmitting substrate;
at least one transparent air gap film including a base and a hyperfine structure constructed on the base, the hyperfine structure defining a relief formation and having a pitch shorter than wavelengths of the light waves guided between the major external surfaces of the light-transmitting substrate, wherein the relief formation is mechanically positioned with the air gap film facing one of the major external surfaces of the light-transmitting substrate to define an interface plane, and wherein the light waves coupled inside the light-transmitting substrate, impinging on the major external surfaces of the light-transmitting substrate at oblique angles, are internally reflected from the interface plane; and
a lens optically coupled to the base, wherein the lens is located next to the first major external surface of the substrate and focuses at least one image, corresponding to at least one of light waves passed through the light-transmitting substrate, and the light waves guided between the major external surfaces of the light-transmitting substrate, to at least one distance, for viewing by an eye of a viewer, or wherein the lens is located next to the second major external surface of the substrate and passes light waves from an external scene image, different from the scene image, through the light-transmitting substrate, for viewing by the eye of the viewer.

22. The optical system of claim 21, wherein the lens is electronically controlled.

23. The optical system of claim 21, wherein the lens is a dynamic lens.

24. The optical system of claim 21, wherein the lens is a Fresnel lens.

25. The optical system of claim 21, wherein the lens corrects aberrations of the eye of the viewer.

26. The optical system of claim 21, wherein the lens is a focusing lens.

27. The optical system of claim 21, wherein the lens is a collimating lens.

28. The optical system of claim 21, wherein the lens is located next to the first major external surface of the substrate, and the lens focuses light waves from the external scene image into the eye of the viewer together with the light waves from the scene image that are coupled-out through the interface plane.

* * * * *